COMPUTER FUNCTION GENERATION

Original Filed Oct. 18, 1955

JOHN M. HUNT
INVENTOR

BY Richard A. Stephens
ATTORNEY

United States Patent Office

Re. 24,634
Reissued Apr. 21, 1959

24,634

COMPUTER FUNCTION GENERATION

John M. Hunt, Palo Alto, Calif., assignor to Link Aviation, Inc., Binghamton, N.Y., a corporation of New York Original No. 2,840,309, dated June 24, 1958, Serial No. 541,180, October 18, 1955. Application for reissue July 16, 1958, Serial No. 749,040

14 Claims. (Cl. 235—191)

Matter enclosed in heavy brackets [ ] appears in the original patent but forms no part of this reissue specification; matter printed in italics indicates the additions made by reissue.

This invention relates to the noise-free generation of electrical potentials as non-linear functions of variables. In the design and operation of direct current analog computers, automatic control and instrumentation apparatus, it is frequently necessary or desirable to generate electrical potentials which vary as non-linear functions of a variable. For accurate and stable operation of a computer using such functions, it is usually quite desirable that generated functions be free from "noise," or errors such as those caused by finite potentiometer resolution, servo backlash, static friction, hysteresis and like effects which are commonly incident to electromechanical function generation. If electromechanical means are employed to derive a sine function potential, for example, the errors caused by the above mentioned limitations of electromechanical function generators may constitute a major portion of the derived signal at angles near zero. If the electromechanical function generator comprises the sine winding of a conventional resistance resolver, the adjacent turns of the winding will have relatively great potential differences in the small angle region because the value of the sine function changes rapidly at small angles. The voltage resolution of the sine resolver is accordingly much poorer at small angles than at greater angles, where the value of the sine function changes less rapidly. Conversely, the voltage resolution of the cosine winding of the resolver will be much poorer at angles near ninety degrees than at small angles. Hence it may be seen that the windings of conventional resolver function generators are worst in the regions where such windings are deriving minimum output potentials, sometimes making the percentage error of such function generators very poor at such regions. If potentials derived by such prior art systems are amplified and connected into the many loops common in some computers, such errors will cause inaccurate computer operation and may cause system instability or oscillation.

It is known in the analog computer art that the output potentials from all-electronic integrators are free from the abovementioned errors, and attempts have been made to utilize this characteristic of all-electronic integrators to provide smooth trigonometric function potentials. Very many electric analog computers compute angle potential and function of angle potentials from trigonometric time derivative potentials by integration, such as by means of velocity servos and potentiometers or resolvers, which are subject to the abovementioned errors. By merely substituting a conventional linear electronic integrator for a velocity servo-resolver combination one may derive an output potential linearly commensurate with an angle itself from an input potential proportional to rate of change of the angle, and such an output potential will be substantially free from the abovementioned errors. It will be apparent, however, that such a system may not be used to derive error-free non-linear functions of the angle. One system proposed involves multiplying the input angular rate potential by sine and electronically integrating to obtain cosine and also multiplying the angular rate by cosine and electronically integrating to obtain sine. The sine and cosine multiplications are usually performed by use of a conventional resolver driven by a servo. The servo is positioned by sine and cosine signals obtained as outputs of the electronic integrators. The electromechanical errors or noise introduced by the servo and resolvers are smoothed out by the integrators. However, because a redundant integration operation has been performed by such a system, it is necessary for accurate computation to compare the relative magnitudes of the sine and cosine integrator output potentials to insure that the instantaneous value of the sum of the squares of these two functions is exactly unity. If the comparison indicates departure from unity, it is necessary to apply corective signals to at least one of the integrators to eliminate the discrepancy. It may be seen that such a system is quite complex and expensive.

In a large number of analog computer applications the abovementioned errors are prohibitive only at the regions where the desired function has a steep and nearly linear slope, which as mentioned above, is the region near zero degrees for sine function potentials and the region near ninety degrees for cosine function potentials. This invention combines the output of an electromechanical function generator such as a potentiometer with the output of an electronic integrator to obtain a composite signal representing a non-linear function of an angle, which composite signal is substantially free from resolution and other electromechanical errors in the regions in which such errors are principally significant. A further characteristic desirable in such function generators and accomplished by the invention is generation of the function potential without discontinuities occurring in the range of intended operation.

It is therefore a primary object of the invention to provide improved method and apparatus for generating a substantially noise-free potential over a substantially linear portion of a partially non-linear function of a variable from an input potential commensurate with a time derivative of the variable.

It is an additional object of the invention to provide improved method and apparatus for generating a direct voltage potential as a trigonometric function of an angle, which potential will be substantially free from resolution and backlash errors.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
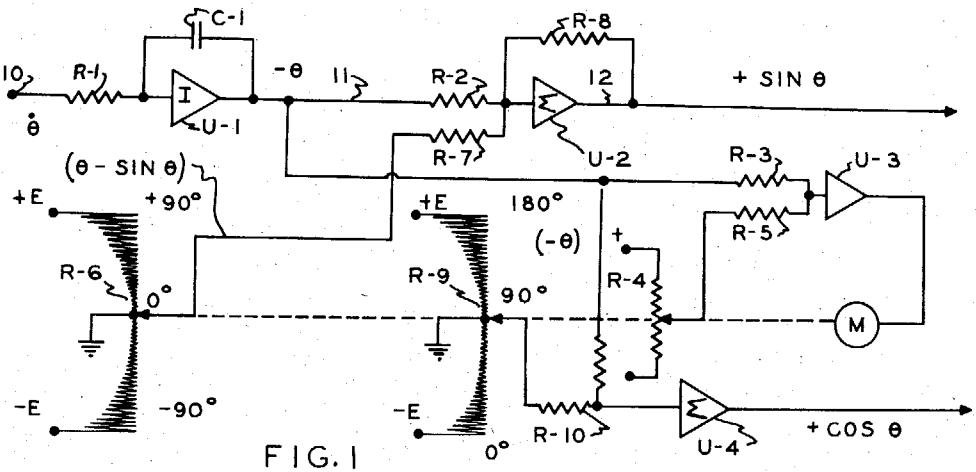
Fig. 1 is an electrical schematic diagram of an exemplary embodiment of the invention connected so as to provide substantially "noise free" sine potentials.

Referring now to Fig. 1 there is shown in electrical schematic form an exemplary embodiment of the invention. All voltages described are taken with respect to ground unless otherwise stated. The rate of change of angle input potential (designated as $\dot{\theta}$) is applied at terminal 10 via a conventional scaling resistor R–1 to the input circuit of a conventional electronic integrator U–1. Integrator U–1 may comprise any of the several well-known electronic integrators, as for example, the "Miller" integrator described in vol. 22 (pp. 79–83) and vol. 20 (pp. 114–118) of the M.I.T. "Radiation Laboratory Series" (McGraw-Hill, New York 1948, 1949) and widely used in direct current analog computing apparatus. Capacitor C–1 is shown as the conventional feedback capacitor utilized in the Miller integrator circuit. As will be apparent the output potential from electronic integrator U–1 on conductor 11 will comprise a potential having a magnitude commensurate with the time integral of the input potential and a polarity opposite in sign to that of the input potential. The $-\theta$ potential output from integrator U–1 is applied via summing resistor R–2 to the input circuit of a conventional analog computer summing amplifier U–2, such as, for example, an amplifier of the type shown in U.S. Patent 2,401,779 granted June 11, 1946, to Karl D. Swartzel. The $-\theta$ potential on conductor 11 is also applied via summing resistance R–3 to the input circuit of a conventional analog computer servo amplifier U–3. The output from servo amplifier U–3 drives $\theta$ servomotor M, and the shaft of $\theta$ servomotor M is mechanically connected to position the arm of linear follow-up potentiometer R–4. The potential derived on the arm of follow-up potentiometer R–4 is applied to the input circuit of servo amplifier U–3 via summing resistance R–5. The voltages applied via resistors R–3 and R–5 are summed at the input circuit of amplifier U–3. It will be seen that with a given $-\theta$ input potential on conductor 11, that servomotor M will rotate until the voltage derived applied via resistor R–5 exactly cancels that applied via resistor R–3. Thus servomotor M will provide a shaft position which is a measure of the angle $\theta$. The output shaft of servomotor M is also connected mechanically to position the arm of non-linear potentiometer R–6, and the potential derived on the arm of potentiometer R–6 is applied via summing resistor R–7 to the input circuit of summing amplifier U–2. Potentiometers R–6 and R–4 are excited by positive and negative constant amplitude voltages from a conventional computer power supply (not shown).

Figure 2:
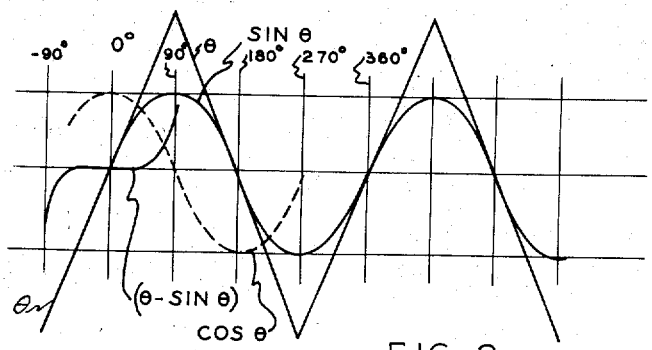
Fig. 2 is a geometrical diagram illustrating graphically the operation of certain portions of various embodiments of the invention.

Non-linear potentiometer R–6 is provided with an "angle minus sine angle" function, or denominating rotation of the arm of potentiometer R–6 as $\theta$, the voltage output on the arm varies in accordance with the quantity $(\theta-\sin\theta)$ as the arm is moved along the non-linear winding. A partial plot of the quantity $(\theta-\sin\theta)$ versus $\theta$ is shown in Fig. 2. It will be noted that the value of the function is very small at small values of the angle $\theta$.

The $(\theta-\sin\theta)$ potential applied via resistance R–7 and the $\theta$ potential applied via resistance R–2 are combined by summing amplifier U–2. The excitation applied to potentiometer R–6 has such a polarity that the $(\theta-\sin\theta)$ quantity derived on the arm of the potentiometer R–6 is positive for negative values of $\theta$ and vice versa. Hence summing amplifier U–2 produces a voltage having a magnitude commensurate with the difference between the applied voltages.

$$-\theta+(\theta-\sin\theta)=-\sin\theta$$

Since amplifier U–2 provides phase inversion, the output potential resulting on conductor 12 is proportional to $+\sin\theta$.

It will be seen that when the angle $\theta$ is a small value, that the resultant input applied to summing amplifier U–2 is made up almost entirely by the output signal from electronic integrator U–1, so that "noise" or erratic operation due to finite resolution, backlash and like effects of potentiometer R–6 and the $\theta$ servo do not appreciably contribute to or affect the output signal on conductor 12. As the value of the angle $\theta$ increases, the output signal will be seen to be derived increasingly percentagewise by potentiometer R–6 and decreasingly by the electronic integrator output. At large values of $\theta$, a considerable portion of the total input applied to summing amplifier U–2 is comprised of the potentiometer R–6 output, and hence any finite resolution effects of potentiometer R–6 and the mechanical errors of the $\theta$ servo will unavoidably introduce noise errors in the output. But since the magnitude of the function $\sin\theta$ is large at large values of the angle $\theta$, the percentage of noise or errors in the output potential will not become prohibitive. Additionally, the use of the $(\theta-\sin\theta)$ corrective term does guarantee quantitative accuracy of the $\sin\theta$ output potential throughout its range from $-90$ degrees to $+90$ degrees, thereby eliminating serious errors which would occur if an attempt were made to linearize the computation by the small angle approximation "$\sin\theta$ equals $\theta$." It will be recognized that since a cosine function is identical to a sine function displaced ninety degrees, that a potentiometer R–9 having the same function winding as R–6 may be used as shown in Fig. 1 to provide a cosine potential output over a range from zero degrees to 180 degrees. The potential proportional to $(\theta-\cos\theta)$ derived on the arm of potentiometer R–9 is applied via summing resistor R–10 to be combined with the $-\theta$ potential from integrator U–1 in summing amplifier U–4. Since the $(\theta-\cos\theta)$ potential from potentiometer R–9 comprises an extremely small portion of the total input to summing amplifier U–3 when the value of $\theta$ is near 90 degrees, it will be seen that the cosine function output potential from summing amplifier U–4 will be comprised almost wholly of the noise-free integrator output, and only when the value of the angle $\theta$ departs considerably from ninety degrees will the $\cos\theta$ output potential carry the noise signals incident to electromechanical function generation.

Figure 3:
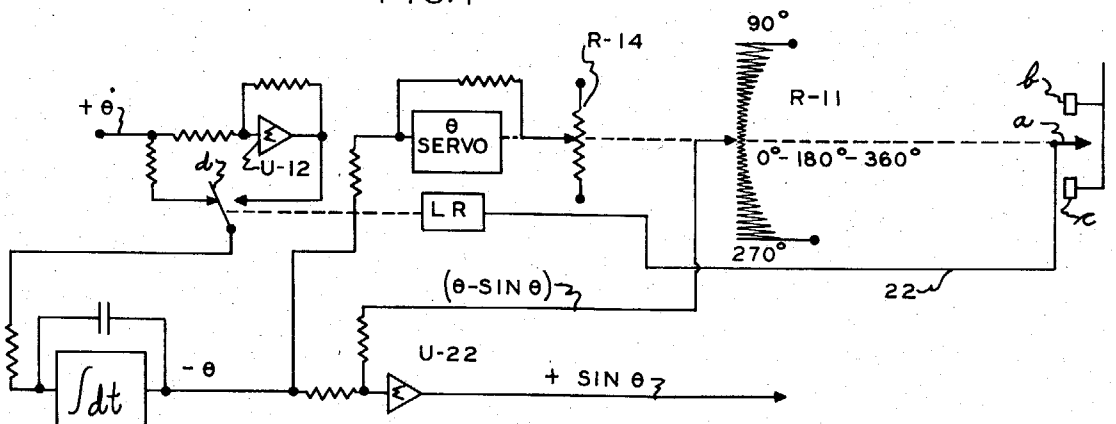
Fig. 3 is an electrical schematic diagram of an alternative embodiment of the invention connected to provide sine function output potentials continuously through unlimited values of an angle.

Shown in schematic form in Fig. 3 is an embodiment of the invention capable of providing sine function output potentials continuously through 360 degrees or more. A $\theta$ servo having a linear follow-up potentiometer R–14 is connected to be positioned in accordance with the output of a D.C. electronic integrator U–11, and the servo drives the wiper arms of $(\theta-\sin\theta)$ potentiometer R–11. This potentiometer may be identical to the non-linear potentiometers of Fig. 1. The negative $\theta$ output potential from electronic integrator U–11 (upon application of a positive $\dot{\theta}$ input signal) is applied to summing amplifier U–22 to be summed with the $(\theta-\sin\theta)$ function to produce a sine function output potential. If the rate of change of angle input $\dot{\theta}$ applied to the circuit of Fig. 1 remained at one polarity continuously, as the angle $\theta$ increased beyond 90°, electronic integrator U–1 would continue to provide an increasingly negative output, up to a point determined by the power supply voltage applied to the integrator. Since the sine function slope changes sign at ninety degrees and the sine function magnitude changes sign at 180 degrees, it will be seen that if the electronic integrator output is to approximate closely the total value of the sine function at 180 degrees as well as 90 degrees, that the integrator output must change slope at or near 90 degrees and must change sign at 180 degrees. As the $\theta$ servo of Fig. 2 drives cam arm a to 90 degrees, arm a contacts mechanical limit b, applying a potential via conductor 22 to a conventional latching relay LR. Transfer of relay LR contact d connects the input circuit of integrator U–11 to the output circuit of a polarity inversion device shown as comprising unity-gain feedback amplifier U–12. The reversal of the polarity of the input signal causes integrator U–11 to integrate in the reverse direction as required, and the $\theta$ servo reverses direction. In usual function generators the mechanical switching of a relay contact is to be avoided since it may introduce discontinuities into the generated function. In the invention, however, the transient disturbing effects of the transfer of contact d of relay PSR are smoothed out by the action of integrator U–11, and no discontinuities appear in the output signals. As the angle $\theta$ increases further to 270 degrees, cam arm a strikes mechanical limit c, causing latch relay LR to return to its original position, and re-connecting arm d of relay LR directly to the uninverted input signal, so that integrator U–11 begins to integrate in its original direction. It will be seen that the system angular rotation is unlimited and may continue through many revolutions of the angle $\theta$ providing a sawtooth-shaped output from integrator U–11 as shown in Fig. 2. In view of the above explanation it will be apparent that converse operation will appear if the $\dot{\theta}$ input signal is reversed in polarity, so that bi-directional operation is obtained.

While I have shown the invention as being applied to the generation of particular trigonometric function potentials, it is important to note that it is as well applicable to the generation of the other trigonometric functions and also to the generation of potentials as functions of an extremely large number of other variables, such as functions of Mach Number, altitude, pressure, and many others. In fact, the invention may be applied to provide substantially noise-free generation of potentials over a range or region of interest as a function of any variable which is approximately linear over such region of interest if a potential commensurate with a time derivative of the variable if available as an input quantity. By providing a linear output from an electronic integrator, and a non-linear output in accordance with the desired function minus the linear function, and by combining the two outputs, one may provide the desired function substantially noise-free over its linear region of interest, with quantitative accuracy over its extended or entire range of operation. It will be understood that while I have illustrated the invention as being applied to particular functions which have a value of zero at zero value of the variable, that this is in no way a limitation of the invention. By merely adding a fixed voltage of proper polarity via a summing resistor (not shown) into any of the summing amplifiers which combine integrator output with a potentiometer-derived non-linear function, one may "shift" the linear potential so as to locate its zero value at the required value of the variable.

The servos shown in Figs. 1 and 3 may comprise conventional analog computer servos, and may include well-known servo-mechanism refinements not shown, such a tachometer generator or other rate feedback means, reduction gearing, and mechanical or electrical limit stops or switches, for example. The summing amplifiers shown may be provided with well-known refinements, such as chopper stabilization to prevent drift, for example. The non-linear potentiometer function generators are indicated as having resistance card windings of non-uniform width, but those skilled in the art will recognize that the required non-linear functions may be supplied in many embodiments of the invention by one or more of other known potentiometer "shaping" methods, such as padding resistors connected to taps of a linear potentiometer, or by providing selected voltages to taps of a linear potentiometer. Furthermore, linear potentiometer windings having non-linear mechanical wiper arm actuating means may be substituted without departing from the invention.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for generating desired potentials which are substantially noise-free over a range of interest of a variable, which potentials vary as non-linear functions of said variable and which potentials are quantitatively accurate over an extended range comprising in combination, means for electronically generating a first potential as a linear function of said variable, means for electromechanically generating a second potential in accordance with the difference between the desired function of said variable and said linear function, and summing means combining said first and second potentials to provide an output potential in accordance with said desired function of said variable.

2. Apparatus for generating a potential which is substantially noise-free over a substantially linear range of interest of a variable and which varies as a non-linear function of said variable over an extended range of said variable comprising in combination, means for electronically integrating an input potential commensurate with a time derivative of said variable to obtain a substantially noise-free first potential varying as a linear function of said variable, electromechanical function generating means responsive to said first potential for providing a second potential which varies as a function of the difference between the desired function of said variable and said linear function, and summing means responsive to said first and second potentials to provide an output potential in accordance with said desired function of said variable.

3. Apparatus according to claim 2 in which said electromechanical function generating means comprises a servo connected to be positioned in accordance with said first potential and a non-linear potentiometer having its wiper arm positioned by the shaft output of said servo to provide said second potential.

4. Apparatus according to claim 2 for generating a potential in accordance with the sine function of a variable $\theta$, in which said input potential is commensurate with the time derivative of $\theta$, said first potential is linearly proportional to $\theta$, and said electromechanical function generating means provides a second potential varying accordance with $(\theta - \sin \theta)$.

5. Apparatus according to claim 2 for generating a potential in accordance with the cosine function of a variable $\theta$, in which said input potential is commensurate with the time derivative of $\theta$, said first potential is linearly proportional to $\theta$, and said electromechanical function generating means provides a second potential varying in accordance with $(\theta - \cos \theta)$.

6. Apparatus for generating periodic function potentials which are substantially noise-free over a substantially linear range of interest of a function of a variable, said variable having a non-linear region, comprising electronic integrating means responsive to an input signal commensurate with a time derivative of said variable to provide a linear first potential commensurate with said variable, a servomechanism responsive to said first potential and connected to operate a non-linear function generator, said function generator having a function corresponding to the difference between a desired periodic function and said linear function to produce a second potential, summing means responsive to said first and second potentials to provide an output potential, and means responsive to said linear first potential to reverse the direction of operation of said electronic integrating means substantially simultaneously with reversal in the slope of said periodic function.

7. Apparatus according to claim 6 in which said periodic function is trigonometric and in which the last-named means comprises a switch operable by said servomechanism to reverse the polarity of the input signal applied to said integrating means.

*8. Apparatus for generating a substanially noise-free desired potential which varies as the sine function of a variable, comprising, in combination, a source of input potential commensurate with the time rate of change of said variable, an electronic integrator circuit means responsive to said input potential for producing a first output potential proportional in magnitude and sense to said variable, an electromechanical position servomechanism responsive to said first output potential and operative to mechanically position a shaft in accordance with the magnitude and sense of said first output potential, a potentiometer connected to said shaft to be positioned thereby, said potentiometer having a voltage-versus-shaft-rotation characteristic proportional to the variable less the sine function of the variable to provide a second output potential, and circuit means for algebraically combining said first and second output potentials provide said desired potential.*

*9. Apparatus for generating a substantially noise-free desired potential which varies as a desired function of a variable over a range of values where said function is substantially a linear function of said variable, comprising, in combination, a source of input potential commensurate with the time rate of change of said variable, an electronic integrator circuit means responsive to said input potential for producing a first output potential proportional in magnitude and sense to said variable, said integrator circuit means comprising an operational amplifier having an input circuit coupled to said source and also having an output circuit and a feedback capacitor connected between said input and output circuits, a servomechanism input circuit connected to said output circuit to be supplied with said first output potential, a servomechanism amplifier connected to said servomechanism input circuit, a motor connected to said servomechanism amplifier to be excited thereby and having an output shaft, a first potentiometer having a movable element connected to said shaft and having a voltage-output-versus-element-displacement characteristic substantially proportional to said element displacement less said desired function of said displacement, a second potentiometer having a movable element connected to said motor shaft and having a substantially linear voltage-ouput-versus-element-displacement characteristic, means algebraically combining the output voltage of said second potentiometer with said first output potential in said servomechanism input circuit, and further means algebraically combining the output voltage of said first output potential to provide said desired potential, whereby the effects of noise produced by said motor and potentiometers are substantially minimized.*

*10. Apparatus for generating a substantially noise-free desired potential which varies as the sine function of a variable in a range including relatively small values of said variable, comprising, in combination, a source of input potential commensurate with the time rate of change of said variable, an electronic integrator circuit means responsive to said input potential for producing a first output potential proportional in magnitude and sense to said variable, said integrator circuit means comprising an operational amplifier having an input circuit coupled to said source and also having an output circuit and a feedback capacitor connected between said input and output circuits, a servomechanism input circuit connected to said output circuit to be supplied with said first output potential, a servomechanism amplifier connected to said servomechanism input circuit, a motor connected to said servomechanism amplifier to be excited thereby and having an output shaft, a first potentiometer having a movable element connected to said shaft and having a voltage-output-versus-element-displacement characteristic substantially proportional to said element displacement less the sine function of said displacement, a second potentiometer having a movable element connected to said motor shaft and having a substantially linear voltage-output-versus-element-displacement characteristic, means algebraically combining the output voltage of said second potentiometer with said first output potential in said servomechanism input circuit, and further means algebraically combining the output voltage of said first output potential to provide said desired potential, whereby the effects of noise produced by said motor and potentiometers are substantially minimized.*

*11. Apparatus for generating a substantially noise-free desired potential which varies as a desired function of a variable over a range of values where said function is substantially a linear function of said variable, comprising, in combination, a source of noise-free input potential commensurate with said variable, a servomechanism input circuit connected to be supplied with said input potential, a servomechanism amplifier connected to said servomechanism input circuit, a motor connected to said servomechanism amplifier to be excited thereby and having an output shaft, a first potentiometer having a movable element connected to said shaft and having a voltage-output-versus-element-displacement characteristic substantially proportional to said element displacement less said desired function of said displacement, a second potentiometer having a movable element connected to said motor shaft and having a substantially linear voltage-output-versus-element-displacement characteristic, means algebraically combining the output voltage of said second potentiometer with said input potential in said servomechanism input circuit, and further means algebraically combining the output voltage of said first potentiometer with said input potential to provide said desired potential, whereby the effects of noise produced by said motor and potentiometers are substantially minimized.*

*12. Apparatus for generating a substantially noise-free desired potential which varies as the sine function of a variable in a range including relatively small values of said variable, comprising, in combination, a source of noise-free input potential commensurate with said variable, a servomechanism input circuit connected to said output circuit to be supplied with said input potential, a servomechanism amplifier connected to said servomechanism input circuit, a motor connected to said servomechanism amplifier to be excited thereby and having an output shaft, a first potentiometer having a movable element connected to said shaft and having a voltage-output-versus-element-displacement characteristic substantially proportional to said element displacement less the sine function of said displacement, a second potentiometer having a movable element connected to said motor shaft and having a substantially linear voltage-output-versus-element-displacement characteristic, means algebraically combining the output voltage of said second potentiometer with said input potential in said servomechanism input circuit, and further means algebraically combining the output voltage of said first potentiometer with said input potential to provide said desired potential, whereby the effects of noise produced by said motor and potentiometers are substantially minimized.*

*13. Apparatus for generating a desired potential which varies as a trigonometric function of a variable, comprising in combination, an electronic integrator circuit responsive to an input potential commensurate with the time rate of change of said variable and operative to provide a noise-free first output potential which varies in accordance with said variable, an electromechanical position servomechanism connected to be responsive to said first output potential and operative to mechanically position a shaft in accordance with the magnitude of said first output po-*

*tential, a potentiometer having a winding and a wiper arm movable along said winding, said winding having a function characteristic according to said variable minus said trigonometric function of said variable, said wiper arm being mechanically connected to said shaft to be moved relative to said winding, said winding being connected to a source of constant voltage, thereby to provide a second output potential of opposite polarity which varies in magnitude in accordance with said variable minus said trigonometric function of said variable, and potential summing circuit means connected to receive said first and second output potentials for algebraically combining said output potentials to provide said desired potential.*

*14. Apparatus for generating a desired potential which is substantially noise-free over a range of interest and which varies as a desired non-linear function of a variable and which is quantitatively accurate over an extended*

*range, comprising in combination, means for electronically generating a first potential as a predetermined function of said variable, means for electromechanically generating a second potential in accordance with the difference between the desired function of said variable and said predetermined function, and summing means combining said first and second potentials to provide an output potential in accordance with said desired function of said variable.*

References Cited in the file of this patent or the original patent

Electronic Analog Computers (Korn and Korn), 1952.

The Review of Scientific Instruments (MacNee), March 1953, pages 207–211.

RCA Review (Goldberg), September 1952, pages 265–274.